United States Patent

Morioka et al.

[11] Patent Number: 6,034,143
[45] Date of Patent: Mar. 7, 2000

[54] FOAMED STYRENE RESIN MATERIAL AND HEAT INSULATING MATERIAL USING THE SAME FOR CONSTRUCTION

[75] Inventors: Ikuo Morioka; Yukio Aramomi, both of Nara; Mutsuhiko Shimada, Kyoto, all of Japan

[73] Assignee: Sekisui Plastics Co., Ltd., Osaka, Japan

[21] Appl. No.: 09/320,687

[22] Filed: May 27, 1999

Related U.S. Application Data

[63] Continuation of application No. 09/068,018, May 1, 1998.

[30] Foreign Application Priority Data

Nov. 8, 1995 [JP] Japan .................................... 7-290046

[51] Int. Cl.$^7$ ................................. C08J 9/228; C08J 9/24
[52] U.S. Cl. ................................................ 521/60; 521/56
[58] Field of Search ........................................ 521/56, 60

[56] References Cited

U.S. PATENT DOCUMENTS

| | | | |
|---|---|---|---|
| 3,192,169 | 6/1965 | Doak | 54/56 |
| 3,288,731 | 11/1966 | Ingram et al. | 54/56 |
| 3,657,162 | 4/1972 | Finestone | 54/56 |
| 4,085,169 | 4/1978 | Saito et al. | 54/56 |
| 4,173,688 | 11/1979 | Saito et al. | 54/56 |
| 4,174,425 | 11/1979 | Saito et al. | 54/56 |

FOREIGN PATENT DOCUMENTS

| | | |
|---|---|---|
| 49-2994 | 1/1974 | Japan . |
| 55-49631 | 12/1980 | Japan . |
| 56-50935 | 5/1981 | Japan . |
| 57-34296 | 7/1982 | Japan . |
| 4-502173 | 4/1992 | Japan . |

OTHER PUBLICATIONS

ShuichiKanyo Gijutsu–shu 57(1982)—133[3347].

*Primary Examiner*—Morton Foelak
*Attorney, Agent, or Firm*—Nikaido Marmelstein Murray & Oram, LLP

[57] ABSTRACT

A foamed styrene resin material has a density $\rho$ of 0.02 to 0.008 and a melt tension of the styrene resin of 5 to 40 gf. The relation between an average cell diameter d ($\mu$m) and the density $\rho$ is given by the expression:

$$\frac{35}{\rho^{1/3}} \leq d \leq \frac{70}{\rho^{1/3}} \quad (1)$$

and a relation between a thermal conductivity $\lambda$ (kcal/m·h·°C.) and the density $\rho$ given by the expression:

$$\lambda \leq 0.0001 \times \frac{1}{\rho} + 0.023. \quad (2)$$

Accordingly, the foamed styrene resin material has a low thermal conductivity and excellent insulating property in spite of a low density (high expansion ratio foam) thereof.

6 Claims, 1 Drawing Sheet

FOAMED STYRENE RESIN MATERIAL AND HEAT INSULATING MATERIAL USING THE SAME FOR CONSTRUCTION

This is a continuation application of U.S. patent application Ser. No. 09/068,018, filed on May 1, 1998, the disclosure of which is hereby incorporated by reference.

TECHNICAL FIELD

The present invention relates to a foamed styrene resin material which is superior in heat insulating property. More particularly, it relates to a foamed styrene resin material which is a low-density high expansion ratio foam and has a low thermal conductivity and excellent insulating property, and a heat insulating material using the same for construction.

BACKGROUND TECHNIQUE

A foamed styrene resin material is generally produced by using foamable styrene polymer particles as a raw material, foaming the foamable styrene polymer particles with heating using steam, etc. to form pre-foamed particles once, filling a closed mold having a lot of small pores with the pre-foamed particles, foaming again with heating using pressurized steam to fill voids between the pre-foamed particles and to fuse the pre-foamed particles each other, followed by cooling and further removal from the mold.

The above foamable styrene polymer particles are normally produced by suspending a styrene monomer in water to polymerize the styrene monomer and impregnating the resulting polymer with a foaming agent, or produced by suspending styrene polymer particles in water, feeding a styrene monomer continuously or intermittently to polymerize the styrene monomer and impregnating the resulting polymer with a foaming agent (seed polymerization method) as shown in Japanese Patent Publication No. 49-2994.

The above foamed styrene resin material is, for example, used in a wall material of buildings by interposing it into panels as a heat insulating material. Accordingly, since a high heat insulating property is required to the foamed styrene resin material, the thermal conductivity must be reduced as possible. As the foamed styrene resin material used as the heat insulating material, a foamed material having a expansion ratio of about 30 to 40 has hitherto been used, mainly.

On the other hand, in order to reduce the production cost in the foamed styrene resin material, it is necessary to reduce the amount of styrene used as a raw material or reduce the thickness of the foamed material. Also, there is such an advantage that the living space can be widen when the thickness of the foamed material is reduced. Therefore, it is required to obtain a foamed styrene resin material of a higher expansion ratio (e.g. expansion ratio of about 50 to 125) without deteriorating the heat insulating property.

As a method of obtaining the foamed styrene resin material of the styrene resin, Japanese Patent Publication No. 57-34296 discloses that a specific thiourea compound is contained in styrene polymer particles, together with a foaming agent, to obtain a foamed material in which a lot of fine cells are formed. Furthermore, Japanese Patent Publication No. 55-49631 discloses that a specific thiodipropionate ester or thiodibutyrate ester is contained in styrene polymer particles, together with a predetermined foaming agent, to obtain a foamed material in which a lot of fine cells are formed like the one described above.

However, the foamed styrene resin material has a feature that the thermal conductivity becomes high when the expansion ratio becomes high. For example, according to the graph illustrating a relation between the specific gravity and the thermal conductivity shown in "1. Thermal Conductivity" in "6-2 Physical Properties of Foam (for general-purpose) using Polystyrene Particles" described in page 89 of Shuchi-Kanyo Gijutsu-shu 57 (1982)-133[3347] issued on Aug. 3, 1982 by the Japanese Patent Office, it is disclosed that the thermal conductivity is about 0.030 kcal/m·h·° C. when the expansion ratio is 33 (specific gravity: 30 g/l) while the thermal conductivity increases to about 0.034 to 0.035 kcal/m·h·° C. when the expansion ratio is 50 (specific gravity: 20 g/l).

The same is also described in Japanese Patent Laid-Open Publication No. 56-50935. That is, the gazette discloses that, in the foamed material of a synthetic resin such as polystyrene, etc., the thermal conductivity becomes minimum when the expansion ratio is from 20 to 30 and the thermal conductivity increases with the increase of the expansion ratio. Japanese Patent Laid-Open Publication No. 56-50935 discloses that an additive having a chemical structure which shows absorption to a specific infrared wavelength and a specific absorptance to black-body radiation at 300° K. is contained in the foamed styrene resin material on the basis of a knowledge that such an increase in thermal conductivity at a high expansion ratio can be eliminated by reducing the influence of the radiation thermal conductivity.

However, the formulation of the above additive is likely to raise the cost and to exert a bad influence on the polymerizing and foaming steps.

Generally, the thermal conductivity of the foamed synthetic resin material is classified into (a) conduction of a solid phase, (b) conduction of a gas phase, (c) radiation between cell membranes and (d) convection of gas in cells on the basis of its conduction mechanism. In case of the high expansion ratio foam, since the volume occupied by the resin upon high expansion ratio is very small, the proportion occupied by the conduction of the solid phase (resin) of (a) in the thermal conductivity is small. The conduction of the gas phase of (b) is advantageous for reducing the thermal conductivity in case of using a Flon gas having a high molecular weight as the foaming agent. However, the influence exerted on the thermal conductivity decreases with a lapse of time because a gas is gradually released from the foamed material to be substituted with air. The convection of gas in cells of (d) is recognized when the cell diameter is not less than 4 mm, and it can be neglected in case of a normal foamed resin material. Accordingly, it is the radiation between the cell membranes of (c) that exerts the largest influence on the thermal conductivity.

The term "radiation" used herein means heat transfer which arises between two opposite surfaces having a different surface temperature. In the foamed material, the effect of damping the radiation heat transfer by the solid surface (resin) constituting the cells is large. Accordingly, it is considered that the cell diameter of the foamed material has a close relation to the isolation of the radiation heat, that is, the smaller the cell diameter is, the larger the number of heat flow isolation times per unit thickness (i.e. the number of cell membranes for damping the radiation heat) is, thereby reducing the thermal conductivity.

However, according to the study results of the present inventors, the thermal conductivity was not reduced in the foamed styrene resin material (high expansion ratio) having a density of not more than 0.02 $g/cm^3$ even if the cell diameter becomes small.

A main object of the present invention is to provide a foamed styrene resin material which has a low thermal conductivity and excellent heat insulating property in spite of a low density (high expansion ratio foam).

DISCLOSURE OF THE INVENTION

In order to solve the above problems, the present inventors have intensively studied. As a result, the present inventors have found a novel fact which has never been predicted heretofore. That is, in the high expansion ratio foam, the thermal conductivity becomes minimum only when the cell diameter is within the predetermined range and, when it deviates from the range, the thermal conductivity becomes high.

The reason why the thermal conductivity does not decrease with the decrease of the cell diameter is assumed as follows. That is, the reason why the thermal conductivity decreases with the decrease of the cell diameter in the high expansion ratio foam is that the number of the heat flow insulation times increases with the increase of the number of the cell membranes as described above. However, when the cell diameter decreases sufficiently, the thickness of each cell membrane decreased drastically. Regarding the thin cell membrane, a capability of insulating the radiation heat is deteriorated compared with the thick cell membrane and, therefore, even if a lot of thin cell membranes are present, the radiation heat is not effectively insulated on the whole of the foamed material.

The present inventors have intensively studied to define a proper range of the cell diameter for decreasing the thermal conductivity. As a result, the present inventors have found a novel fact that, in a foamed styrene resin material having a density $\rho$ of 0.02 to 0.008 g/cm$^3$ (expansion ratio: 50 to 125), when a melt tension of the styrene resin is from 5 to 40 gf and there exist a relation between an average cell diameter d ($\mu$m) and the density $\rho$ given by the expression:

$$\frac{35}{\rho^{1/3}} \leq d \leq \frac{70}{\rho^{1/3}} \quad (1)$$

and a relation between a thermal conductivity $\lambda$ and the density $\rho$ given by the expression:

$$\lambda \leq 0.0001 \times \frac{1}{\rho} + 0.023. \quad (2)$$

the above problems can be solved and a foamed styrene resin material having a high expansion ratio (low density) and excellent heat insulating property can be obtained. Thus, the present invention has been accomplished.

The foamed styrene resin material of the present invention is most suitable for a heat insulating material for construction because of its excellent heat insulating property.

BEST MODE FOR CARRYING OUT THE INVENTION

Figure 1:
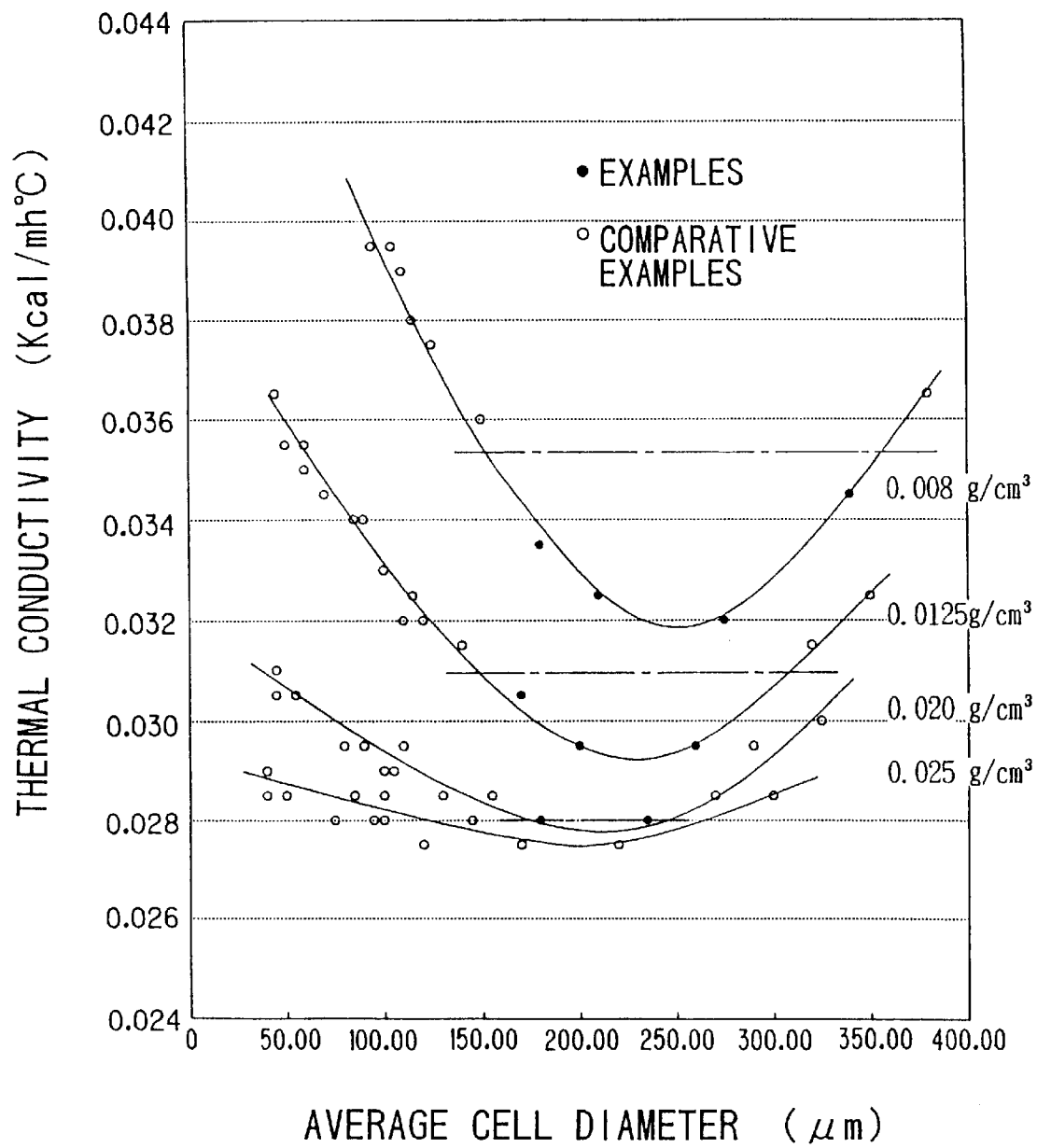
FIG. 1 is a graph illustrating a relation between the average cell diameter and the thermal conductivity of the foamed styrene resin materials obtained in Examples and Comparative Examples, with varying the density.

The foamed styrene resin material in the present invention is produced by pre-foaming foamable styrene polymer particles, filling a mold with the resulting pre-foamed styrene particles, followed by foaming with heating as described above.

As the foamable styrene polymer particles, there can be used (i) those obtained by a so-called suspension polymerization method of suspending a styrene monomer in water to polymerize the styrene monomer and impregnating the resulting polymer with a foaming agent, (ii) those obtained by a so-called seed polymerization method of dispersing styrene polymer particles (seed particles) in an aqueous medium, feeding a styrene monomer continuously or intermittently to suspension-polymerize the styrene monomer in the presence of a polymerization initiator and impregnating the resulting polymer with a foaming agent or the like. The seed polymerization method is preferable for the production of a foamed material having a cell diameter larger than that of a foamed material obtained by the suspension polymerization.

As the styrene polymer particles obtained by suspension polymerization of the styrene monomer and the styrene polymer particles (seed particles) used in the above seed polymerization method, there can be used a homopolymer of styrene, a copolymer (of not less than 50% by weight, preferably not less than 80% by weight) of a styrene component and the other polymerizable monomer and the like. Examples of the above copolymerizable monomer include α-methylstyrene, acrylonitrile, ester of acrylic or methacrylic acid and an alcohol having 1 to 8 carbon atoms, maleic anhydride, N-vinylcarbazole and the like.

In the above seed polymerization method, when the particle diameter of the styrene polymer seed particles is within a certain narrow range, the particle diameter of the resulting foamable styrene polymer particles is uniform. As the seed particles, there can be used polymer particles produced by once sifting the polymer particles, obtained by the suspension polymerization method, and adjusting the particle diameter of the polymer particles within the range from +20 to -20% of the average particle diameter. When the polymer particles are obtained by the bulk polymerization method, a pelletized one having a desired particle diameter is used. Therefore, according to the seed polymerization method, foamable styrene polymer particles having a particle diameter within a desired range in accordance with use can be produced in a yield of approximately 100%. For example, foamable styrene polymer particles are obtained by classifying as follows: 0.3–0.5 mm, 0.5–0.7 mm, 0.7–1.2 mm, 1.2–1.5 mm and 1.5–2.5 mm.

An amount of the above polymer seed particles used is from 10 to 90% by weight, preferably from 15 to 50% by weight, based on the total amount of the polymer at the time of the completion of the reaction. When the amount of the seed particles is less than 10% by weight, it becomes difficult to control a polymerization degree of the polymer particles within a proper range in case of feeding the styrene monomer. Therefore, it becomes disadvantageous industrially, that is, the molecular weight of the resulting polymer becomes higher and a large amount of a finely powdered polymer is produced to decrease the production efficiency. On the other hand, when the amount exceeds 90% by weight, it becomes difficult to obtain excellent foaming moldability.

As the above styrene monomer, styrene derivatives including styrene (e.g. α-methylstyrene, p-methylstyrene, etc.) can be used alone or in combination thereof. A bifunctional monomer such as divinylbenzene, alkylene glycol dimethacrylate, etc. may be used in combination. It is also possible to use various monomers capable of copolymerizing with styrene such as ester of acrylic or methacrylic acid and an alcohol having 1 to 8 carbon atoms, acrylonitrile, dimethyl fumarate, etc. in combination.

As the polymerization initiator used in the above suspension polymerization method and seed polymerization method, there can be used a radical formation type polymerization initiator used in a normal suspension polymerization of styrene. Examples thereof include organic peroxides such as benzoyl peroxide, lauryl peroxide, t-butyl peroxybenzoate, t-butyl peroxypivalate, t-butyl peroxyisopropylcarbonate, t-butyl peroxyacetate, 2,2-t-butyl peroxybutane, t-butyl-peroxy-3,3,5-trimethylhexanoate, di-t-butyl peroxyhexahydroterephthalate, etc., and azo compounds such as azobisisobutyronitrile, azobisdimethylvaleronitrile, etc. These polymerization initiators can be used alone or in combination thereof, but it is preferred to use a polymerization initiator whose decomposition temperature for obtaining a half-life of 10 hours is within the range from 50 to 80° C. in combination with a polymerization initiator whose decomposition temperature is within the range from 80 to 120° C. in order that the amount of the residual monomer may be reduced by adjusting the molecular weight.

Examples of a suspension stabilizer used to disperse small droplets of the styrene monomer in an aqueous medium include water-soluble polymers such as known polyvinyl alcohol, methylcellulose, polyacrylamide, polyvinyl pyrrolidone, etc. and slightly soluble inorganic compounds such as calcium tertiary phosphate, magnesium pyrophosphate, etc., which have generally been used heretofore in the suspension polymerization. When using the slightly soluble inorganic compound, an anionic surfactant is normally used in combination.

Examples of the anionic surfactant include carboxylates such as fatty acid soap, N-acylamino acid or a salt thereof, alkyl ether carboxylate, etc.; sulfonates such as alkylbenzenesulfonic acid (e.g. calcium dodecylbenzenesulfonate, sodium dodecylbenzenesulfonate, etc.), alkylnaphthalenesulfonate, dialkylsulfosuccinate ester salts, alkylsulfoacetate, α-olefinsulfonate, etc.; sulfate ester salts such as higher alcohol sulfate ester salt, secondary higher alcohol sulfate ester salt, alkyl ether sulfate, polyoxyethylene alkylphenyl ether sulfate, etc.; and phosphate ester salts such as alkyl ether phosphate ester salt, alkyl phosphate ester salt, etc.

The anionic surfactant serves as an auxiliary stabilizer for dispersing by means of the above suspension stabilizer, and exerts an influence on the diameter of cells in the foamed material obtained by dissolving in or mixing a part of the anionic surfactant with the styrene polymer particles. Accordingly, it is necessary to select the anionic surfactant so that the cell diameter is within the range shown by the above expression (1).

In the present invention, a melt tension of the polymerized styrene resin is within the range from 5 to 40 gf. The term "melt tension" used herein refers to a tension obtained when the molten resin is stretched under the following conditions.

Measuring device: Capillograph (manufactured by Toyo Seiki Seisakusho Co., Ltd.)

Test temperature: 200° C.

Property of capillary: diameter; 2.05 mm, length; 8.0 mm, entrance angle; 45 degrees Preheating time: 5 minutes Extrusion rate: 20 mm/minute Take-up rate: 8 m/minute The melt tension has a relation to the uniformity of the thickness of the cell membrane. In a case where a melt tension of a styrene resin is less than 5 gf, the thickness of the cell membrane obtained by foaming becomes ununiform and a very thin portion of the cell membrane is formed. Therefore, it becomes difficult to sufficiently insulate the radiation heat, which results in high thermal conductivity. To the contrary, when the melt tension is not less than 5 gf, the thickness of the cell membrane becomes almost uniform and the very thin portion of the cell membrane disappears and, therefore, a capability of insulation of the radiation heat is not lowered. Furthermore, when the melt tension exceeds 40 gf, it becomes difficult to perform high expansion ratio.

In order to adjust the melt tension within the above range, for example, the kind and amount of the polymerization initiator added, polymerization temperature, polymerization time, etc. may be appropriately adjusted.

Examples of the foaming agent with which the styrene resin is impregnated include easily volatile aliphatic hydrocarbon whose boiling point is not more than a softening point of the polymer, such as propane, butane, pentane, cyclopentane, hexane, etc., and HCFC-141b, HCFC-142b, HCFC-124, HFC-134a, HFC-152a, etc. These foaming agents can be used alone or in combination thereof. Among them, the aliphatic hydrocarbon is preferably used because it prevents destruction of the ozone layer and is rapidly substituted with air and, furthermore, the foamed material hardly changes with a lapse of time. It is more preferred to use butane among the aliphatic hydrocarbon.

An amount of the easily volatile foaming agent used is from 1 to 10% by weight, preferably from 2 to 7% by weight, based on 100 parts by weight of the resulting polymer particles. In the seed polymerization method, the above foaming agent is normally added by injecting at the post stage of the polymerization or after polymerization, thereby impregnating the polymer particles.

In the above suspension polymerization method and seed polymerization method, there may appropriately be used additives, which are used in the production of the foamable styrene polymer particles, such as solvent, plasticizer, foamed cell nucleating agent, filler, flame retardant, auxiliary flame retardant, lubricant, colorant, etc., if necessary. It is desired that a weight-average molecular weight of the resulting whole polymer particles is adjusted within the range from 100,000 to 700,000, preferably from 150,000 to 400,000, which is suitable for a normal foam molding. When the weight-average molecular weight is smaller than 100,000, the strength of the foamed molded material is decreased. On the other hand, when the weight-average molecular weight is larger than 700,000, the foaming property is deteriorated. Also regarding the polymer seed particles used in the seed polymerization method, it is preferred to use those obtained by adjusting the weight-average molecular weight within the range suitable for the above foam molding.

In order to adjust the weight-average molecular weight of the polymer particles within the range suitable for a normal foam molding, it is important to make the polymerization initiator serve efficiently. Furthermore, in order to prevent an useless decomposition and to form a radical in the whole polymerization step, it is necessary to adjust/control the amount of the polymerization initiator and polymerization temperature program and, furthermore, the feed rate of the monomer and polymerization degree at the time of polymerization in the seed polymerization method.

The above foamable polystyrene particles are pre-foamed by using steam, etc. to obtain pre-foamed particles whose bulk expansion ratio is from 50 to 150. A foamed styrene resin material is produced by filling a closed mold having a lot of small pores with the resulting pre-foamed particles, foaming again with heating using pressurized steam to fill voids between pre-foamed particles and fusing the pre-foamed particles each other. In the present invention, the density ρ (bulk density) of the foamed styrene resin material is adjusted within the range from 0.008 to 0.02 g/cm³ by adjusting the amount of the pre-foamed particles filled in the mold.

When the density P of the foamed material exceeds 0.02 g/cm³, the clear relation between the average cell diameter and thermal conductivity described above disappears. On the other hand, when the density ρ is less than 0.008 g/cm³, the mechanical strength of the resulting foamed material is decreased and, therefore, it is not suitable for practical use.

In the present invention, it is necessary that the foamed styrene resin material has a relation between the density ρ and the average cell diameter d given by the following expression:

$$\frac{35}{\rho^{1/3}} \leq d \leq \frac{70}{\rho^{1/3}}. \quad (1)$$

When the average cell diameter d of the foamed material having a predetermined density satisfies this expression, the thermal conductivity of the foamed material becomes minimum. When the average cell diameter d does not satisfy the above relation, a foamed material having a low thermal conductivity is not obtained.

Specifically, as shown in FIG. 1, when the foamed styrene resin material has a predetermined density ρ, the above expression (1) illustrates a proper range of the cell diameter where the thermal conductivity of the foamed material becomes minimum. For example, when the density is 0.0125 g/cm³ (expansion ratio: 80), the proper average cell diameter is from 150.8 to 301.6 μm in accordance with the expression (1).

In that case, it is necessary that the foamed material has a relation between the thermal conductivity λ and the density ρ given by the formula:

$$\lambda \leq 0.0001 \times \frac{1}{\rho} + 0.023. \quad (2)$$

Even if the density ρ and the average cell diameter d satisfy the above expression (1), a foamed styrene resin material having excellent heat insulating material can not be obtained when the relation (2) is not satisfied. Specifically, when the density ρ is 0.0125 g/cm³, the thermal conductivity λ is not more than 0.031 kcal/m·h·° C. in accordance with the expression (2).

When the density ρ of the foamed material is, for example, 0.025 g/cm³, 0.020 g/cm³, 0.0125 g/cm³ or 0.008 g/cm³, the average cell diameter d and thermal conductivity λ calculated from the above expressions (1) and expression (2) are shown in Table 1, respectively. The expansion ratio of the foamed material is also shown in Table 1,

TABLE 1

| Foaming ratio (times) | Bulk density (g/cm³) | Value calculated from expressions (1) and (2) | |
|---|---|---|---|
| | | Average cell diameter d (μm) | Thermal conductivity λ (kcal/m·h·° C.) |
| 40 | 0.025 | 119.7–239.4 | not more than 0.027 |
| 50 | 0.020 | 128.9–257.9 | not more than 0.028 |
| 80 | 0.0125 | 150.8–301.6 | not more than 0.031 |
| 125 | 0.008 | 175.0–350.0 | not more than 0.0355 |

It is possible to obtain a foamed styrene resin material having an average cell diameter within the range of the expression (1) by selecting the above surfactant, adjusting the polymerization temperature, selecting the polymerization initiator, selecting the foaming agent, adjusting the impregnation amount of the foaming agent, or adjusting the feeding rate of the monomer in case of the seed polymerization.

FIELD OF INDUSTRIAL APPLICABILITY

The foamed styrene resin material of the present invention has an effect of having a low thermal conductivity and excellent heat insulating property in spite of a low density (high expansion ratio foam).

Particularly, the foamed styrene resin material of the present invention also has the following effect. That is, since the density is lower than that of a conventional high density (low expansion ratio) foamed material having the same heat insulating property, the amount of the raw material used can be reduced. Furthermore, the thickness of the foamed material can be reduced because of its high heat insulting property and, therefore, the foamed material can be produced at a cheap price.

Accordingly, the foamed styrene resin material of the present invention is most suitable for using as a heat insulating material for construction.

EXAMPLE

The following Examples further illustrate the present invention in detail.

Reference Example 1

Production of polystyrene particles by means of suspension polymerization

In a polymerization vessel (internal volume: 100 liter) equipped with a stirrer, water (40.0 liter), calcium tertiary phosphate (100 g) and calcium dodecylbenzenesulfonate (2.0 g) were charged, and styrene (40.0 kg), benzoyl peroxide (96.0 g) and t-butyl peroxybenzoate (28.0 g) were added with stirring, followed by heating to 90° C. as a polymerization temperature.

Then, the mixture was maintained at the same temperature for 6 hours, heated to 125° C. and, 2 hours after, cooled to obtain a particulate polystyrene A. The melt tension of this polystyrene A was measured under the above-described conditions. As a result, it was 17.4 gf.

This polystyrene A was sifted to obtain a polystyrene (A-1) having a particle diameter of 1.4 to 1.0 mm and a polystyrene (A-2) having a particle diameter of 0.9 to 0.6 mm.

Reference Example 2

Production of polystyrene particles by means of seed polymerization

As the seed particles in the seed polymerization, the polystyrene (A-2) having a particle diameter of 0.9 to 0.6 mm obtained in the above Reference Example 1 was used.

In a polymerization vessel (internal volume: 5 liter) equipped with a stirrer, water (2,000 g), the polystyrene (A-2) (500 g), magnesium pyrophosphate (6.0 g) and calcium dodecylbenzenesulfonate (0.3 g) as the surfactant used in case of the suspension polymerization of the seed particles were charged, followed by heating to 70° C. with stirring.

Then, benzoyl peroxide (4.5 g) and t-butyl peroxybenzoate (1.1 g) were dissolved in styrene (200 g) and charged in the polymerization vessel. After 30 minutes, the mixture was heated to 90° C. and styrene (1,300 g) was fed to the polymerization vessel at a fixed rate (650 g/hour) using a pump over 2 hours.

Two hours after heating to 125° C., the reaction product was cooled to isolate polystyrene particles. The polystyrene particles were dried to form a polystyrene (A-3).

On the other hand, according to the same manner as that described above except for changing the time for feeding styrene (1,300 g) to the polymerization vessel at a fixed rate using a pump to 4 hours (feeding rate: 325 g/hour), a polystyrene (A-4) was obtained.

Reference Example 3

According to the same manner as that described in Reference Examples 1 and 2 except for changing the surfactant used in each polymerization step of the above Reference Examples 1 and 2, polystyrene particles (B-1) to (E-1), (B-3) to (E-3) and (B-4) to (E-4) were obtained as shown in Table 2. In Table 2, the polystyrene particles (A-1), (A-3) and (A-4) obtained in Reference Examples 1 and 2 are also shown.

TABLE 2

| | Name of polystyrene obtained | | |
|---|---|---|---|
| | Suspension | Seed polymerization | |
| Kind of surfactants | Polymerization | 2 hours* | 4 hours* |
| Calcium dodecylbenzenesulfonate | A-1 | A-3 | A-4 |
| Sodium dodecylbenzenesulfonate | B-1 | B-3 | B-4 |
| Sodium α-olefinsulfonate | C-1 | C-3 | C-4 |
| Sodium lauryl alcohol sulfonate ester | D-1 | D-3 | D-4 |
| Sodium polyoxyethylene lauryl ether sulfonate | E-1 | E-3 | E-4 |

*time for feeding a monomer

Example 1

In an autoclave (internal volume: 5 liter) equipped with a stirrer, water (2,200 g), the above polystyrene particles (A-1) (1,800 g), magnesium pyrophosphate (6.0 g) and sodium dodecylbenzenesulfonate (0.4 g) were charged, followed by heating to 70° C. with stirring.

Then, tetrabromocyclooctane (23.4 g) and dicumul peroxide (5.4 g) were charged in the autoclave and, after closing the autoclave and heating to 90° C., butane (162 g) was injected and maintained for 4 hours. Then, the reaction product was cooled to 30° C. to isolate foamable polystyrene particles.

The isolated particles were dried, kept in a constant temperature room at 15° C. for 4 days and then pre-foamed by using a steam foaming machine. The resulting pre-foamed particles were aged in a room at 20° C. for 24 hours and molded by using a molding machine for foamed polystyrene (ACE-11QS, manufactured by Sekisui Koki Co., Ltd.) to obtain a plate-like foamed material having a size of 25 mm×200 mm×200 mm. This plate-like foamed material was cured in a drying room at 50° C. for 7 days and the density was measured. As a result, it was 0.0125 g/cm³.

Examples 2 and 3

According to the same manner as that described in Example 1 except for using the polystyrene particles (A-3) and (A-4) in place of the polystyrene particles (A-1), a plate-like foamed material having a density of 0.0125 g/cm³ was obtained, respectively.

The average cell diameter and thermal conductivity of the respective plate-like foamed materials obtained in Examples 1 to 3 were measured, respectively. The results are shown in Table 3.

Average Cell Diameter

According to ASTM-D-2842-69, the average bowstring length (t) was measured by the number of cells, which are present on a straight line (60 mm) of the cut surface, using a scanning electron micrograph of the cut surface of the foamed material, and then the average diameter of the cells, i.e. average cell diameter d was calculated by the following equation.

Average bowstring length t=60/(number of cells)

Average cell diameter d=t/0.616

Thermal Conductivity

According to JIS-A-1412, the thermal conductivity at 20° C. was measured by using a thermal conductivity meter (AUTO-AHC-072) manufactured by Eiko Seiki Co., Ltd.

TABLE 3

| | density: 0.0125 g/cm³ | | |
|---|---|---|---|
| | Example 1 | Example 2 | Example 3 |
| Name of Polymer | (A-1) | (A-3) | (A-4) |
| Average cell diameter (μm) | 170 | 260 | 200 |
| Thermal conductivity (kcal/m · h · ° C.) | 0.0305 | 0.0295 | 0.0295 |

Comparative Examples 1 to 12

According to the same manner as that described in Example 1 except for using the respective polystyrene particles obtained in Reference Example 3 in place of the polystyrene particles (A-1), a plate-like foamed material having a density of 0.0125 g/cm³ was obtained, respectively. The average cell diameter and thermal conductivity of the respective plate-like foamed materials were measured according to the same manner as that described above. The results are shown in Table 4.

TABLE 4

| | density: 0.0125 g/cm³ | | |
|---|---|---|---|
| | Comp.Ex.1 | Comp.Ex.2 | Comp.Ex.3 |
| Name of Polymer | (B-1) | (B-3) | (B-4) |
| Average cell | 110 | 140 | 120 |

TABLE 4-continued density: 0.0125 g/cm³

| diameter (μm)<br>Thermal conductivity<br>(kcal/m · h · ° C.) | 0.0320 | 0.0315 | 0.0320 |
|---|---|---|---|
| | Comp.Ex.4 | Comp.Ex.5 | Comp.Ex.6 |
| Name of Polymer | (C-1) | (C-3) | (C-4) |
| Average cell diameter (μm) | 90 | 115 | 100 |
| Thermal conductivity (kcal/m · h · ° C.) | 0.0340 | 0.0325 | 0.0330 |
| | Comp.Ex.7 | Comp.Ex.8 | Comp.Ex.9 |
| Name of Polymer | (D-1) | (D-3) | (D-4) |
| Average cell diameter (μm) | 60 | 85 | 70 |
| Thermal conductivity (kcal/m · h · ° C.) | 0.0355 | 0.0340 | 0.0345 |
| | Comp.Ex.10 | Comp.Ex.11 | Comp.Ex.12 |
| Name of Polymer | (E-1) | (E-3) | (E-4) |
| Average cell diameter (μm) | 45 | 60 | 50 |
| Thermal conductivity (kcal/m · h · ° C.) | 0.0365 | 0.0350 | 0.0355 |

Comparative Examples 13 and 14

The preparation of the polystyrene particles was conducted by the seed polymerization. That is, water (2,000 g), the polystyrene (A-2) (500 g), magnesium pyrophosphate (6.0 g) and calcium dodecylbenzenesulfonate (0.3 g) were charged in a polymerization vessel (internal volume: 5 liter) equipped with a stirrer, followed by heating to 70° C. with stirring.

Then, benzoyl peroxide (6.0 g) and t-butyl peroxybenzoate (1.1 g) were dissolved in styrene (200 g) and charged in the polymerization vessel. 30 minutes after, the mixture was heated to 95° C. and styrene (1,300 g) was fed to the polymerization vessel at a fixed rate using a pump over 2 hours. Two hours after heating to 125C, the reaction product was cooled to isolate polystyrene particles. The polystyrene particles were dried to obtain polystyrene particles (A-5).

On the other hand, according to the same manner as that described above except for changing the time for feeding styrene (1,300 g) to the polymerization vessel at a fixed rate using a pump to 4 hours in place of 2 hours, polystyrene particles (A-6) were obtained.

Then, according to the same manner as that described in Example 1 except for using the polystyrene particles (A-5) and (A-6) in place of the polystyrene particles (A-1), a plate-like foamed material having a density of 0.0125 g/cm³ was obtained, respectively. The average cell diameter and thermal conductivity of the respective plate-like foamed materials were measured according to the same manner as that described above. The results are shown in Table 5.

TABLE 5 density: 0.0125 g/cm³

| | Comp. Ex. 13 | Comp. Ex. 14 |
|---|---|---|
| Name of Polymer | (A-5) | (A-6) |
| Average cell diameter (μm) | 320 | 350 |
| Thermal conductivity (kcal/m · h · ° C.) | 0.0315 | 0.0325 |

When the relation between the average cell diameter and thermal conductivity of the plate-like foamed materials obtained in Examples 1 to 3 and Comparative Examples 1 to 14 is respectively plotted on the graph of FIG. 1, the curve of the density 0.0125 g/cm³ is obtained. As is apparent from this graph, the thermal conductivity decreases when the average cell diameter is within the range from about 150 to 301 μm in the foamed material having the density of 0.0125 g/cm³.

Comparative Examples 15 to 28

According to the same manner as that described in Example 1 except for using the respective polystyrene particles obtained by the suspension polymerization and seed polymerization in the above Reference Examples and Comparative Examples 13 and 14 and changing the prefoaming ratio, a plate-like foamed material having a density of 0.025 g/cm³ was obtained, respectively. The average cell diameter and thermal conductivity of the respective plate-like foamed materials were measured according to the same manner as that described in Examples 1 to 3. The results are shown in Table 6.

TABLE 6 density: 0.025 g/cm³

| | Comp.Ex.15 | Comp.Ex.16 | Comp.Ex.17 |
|---|---|---|---|
| Name of Polymer | (A-1) | (A-3) | (A-4) |
| Average cell diameter (μm) | 145 | 220 | 170 |
| Thermal conductivity (kcal/m · h · ° C.) | 0.0280 | 0.0275 | 0.0275 |
| | Comp.Ex.18 | Comp.Ex.19 | |
| Name of Polymer | (A-5) | (A-6) | |
| Average cell diameter (μm) | 270 | 300 | |
| Thermal conductivity (kcal/m · h · ° C.) | 0.0285 | 0.0285 | |
| | Comp.Ex.20 | Comp.Ex.21 | Comp.Ex.22 |
| Name of Polymer | (B-1) | (B-3) | (B-4) |
| Average cell diameter (μm) | 95 | 120 | 100 |
| Thermal conductivity (kcal/m · h · ° C.) | 0.0280 | 0.0275 | 0.0285 |
| | Comp.Ex.23 | Comp.Ex.24 | Comp.Ex.25 |
| Name of Polymer | (C-1) | (C-3) | (C-4) |
| Average cell diameter (μm) | 75 | 100 | 85 |
| Thermal conductivity (kcal/m · h · ° C.) | 0.0280 | 0.0280 | 0.0285 |
| | Comp.Ex.26 | Comp.Ex.27 | Comp.Ex.28 |

TABLE 6-continued density: 0.025 g/cm³

| Name of Polymer | (E-1) | (E-3) | (E-4) |
|---|---|---|---|
| Average cell diameter (μm) | 40 | 50 | 40 |
| Thermal conductivity (kcal/m · h · ° C.) | 0.0285 | 0.0285 | 0.0290 |

When the relation between the average cell diameter and thermal conductivity of the plate-like foamed materials obtained in the respective Comparative Examples shown in Table 6 is respectively plotted on the graph of FIG. 1, the curve of the density 0.025 g/cm³ is obtained. As is apparent from this graph, the range of the average cell diameter where the thermal conductivity decreases is not clear and, therefore, the relation of the above expression (1) is not established in the foamed styrene resin material having the density of 0.025 g/cm³.

Example 4, Comparative Examples 29 and 30

According to the same manner as that described in Reference Examples 1 and 2 except for changing the amount of the polymerization initiator added and the polymerization temperature to the conditions shown in Table 7 in the suspension polymerization of Reference Example 1, particulate polystyrenes F to H having a different melt tension were obtained.

TABLE 7

| | Amount of initiator Benzoyl peroxide | polymerization (g) t-Butyl peroxybenzoate | Polymerization Temperature (° C.) | Retension time (hour) | Name of polymer |
|---|---|---|---|---|---|
| Example 1 | 96.0 | 28.0 | 90 | 6 | A |
| Example 4 | 72.0 | 28.0 | 90 | 8 | F |
| Comp. Ex. 29 | 320.0 | 0 | 80 | 6 | G |
| Comp. Ex. 30 | 58.0 | 28.0 | 85 | 10 | H |

Using polystyrenes having a particle diameter of 1.4 to 1.0 mm prepared by sifting the resulting polystyrenes, a foaming agent was injected and molding was conducted according to the same manner as that described in Example 1. As a result, a plate-like foamed material having a density of 0.0125 g/cm³ was obtained in Example 4 and Comparative Example 29, but the plate-like foamed material was not obtained in Comparative Example 30 because the expansion ratio was not increased. The measuring results of the melt tension and the results of the average cell diameter and thermal conductivity of Examples 1 and 4 and Comparative Example 29, measured according to the same manner as that described in Examples 1 to 3, are shown in Table 8.

TABLE 8 density: 0.0125 g/cm³

| | Example 1 | Example 2 |
|---|---|---|
| Name of Polymer | A | F |
| Melting tension (gf) | 17.4 | 30.5 |
| Average cell diameter (μm) | 170 | 175 |
| Thermal conductivity (kcal/m · h · ° C.) | 0.0305 | 0.0300 |

TABLE 8-continued density: 0.0125 g/cm³

| | Comp. Ex. 29 | Comp. Ex. 30 |
|---|---|---|
| Name of Polymer | G | H |
| Melting tension (gf) | 3.8 | 45.1 |
| Average cell diameter (μm) | 170 | Insufficient expansion |
| Thermal conductivity (kcal/m · h · ° C.) | 0.0325 | |

As is apparent from Table 8, when the melt tension is less than 5 gf (Comparative Example 29), the thermal conductivity increases while when it exceeds 40 gf (Comparative Example 30), it becomes difficult to conduct high expansion ratio. On the other hand, in Examples 1 and 4, the thermal conductivity is decreased while high expansion ratio is achieved.

Examples 5 and 6 and Comparative Examples 31 to 42

According to the same manner as that described in Example 1 except for using the respective polystyrene particles obtained in Reference Examples and Comparative Examples 13 and 14 and changing the pre-foaming ratio, a plate-like foamed material having a density of 0.020 g/cm³ was obtained, respectively.

The average cell diameter and thermal conductivity of the respective plate-like foamed materials were measured according to the same manner as that described in Examples 1 to 3. The results are shown in Table 9.

TABLE 9 density: 0.020 g/cm³

| | Comp.Ex.31 | Example 5 | Example 6 |
|---|---|---|---|
| Name of Polymer | (A-1) | (A-3) | (A-4) |
| Average cell diameter (μm) | 155 | 235 | 180 |
| Thermal conductivity (kcal/m · h · ° C.) | 0.0285 | 0.0280 | 0.0280 |

| | Comp.Ex.32 | Comp.Ex.33 |
|---|---|---|
| Name of Polymer | (A-5) | (A-6) |
| Average cell diameter (μm) | 290 | 325 |
| Thermal conductivity (kcal/m · h · ° C.) | 0.0295 | 0.0300 |

| | Comp.Ex.34 | Comp.Ex.35 | Comp.Ex.36 |
|---|---|---|---|
| Name of Polymer | (B-1) | (B-3) | (B-4) |
| Average cell | 100 | 130 | 110 |

TABLE 9-continued density: 0.020 g/cm³

| diameter (μm) Thermal conductivity (kcal/m · h · °C.) | 0.0290 | 0.0285 | 0.0285 |
|---|---|---|---|
| | Comp.Ex.37 | Comp.Ex.38 | Comp.Ex.39 |
| Name of Polymer | (C-1) | (C-3) | (C-4) |
| Average cell diameter (μm) | 80 | 105 | 90 |
| Thermal conductivity (kcal/m · h · °C.) | 0.0295 | 0.0290 | 0.0295 |
| | Comp.Ex.40 | Comp.Ex.41 | Comp.Ex.42 |
| Name of Polymer | (E-1) | (E-3) | (E-4) |
| Average cell diameter (μm) | 45 | 55 | 45 |
| Thermal conductivity (kcal/m · h · °C.) | 0.0310 | 0.0305 | 0.0305 |

When the relation between the average cell diameter and thermal conductivity of the plate-like foamed materials obtained in the respective Examples and Comparative Examples is respectively plotted on the graph of FIG. 1, the curve of the density 0.020 g/cm³ is obtained. As is apparent from this graph, the thermal conductivity decreases when the average cell diameter is within the range from about 129 to 258 μm. Furthermore, the average cell diameters in Comparative Examples 31 and 35 are within the above range, but do not satisfy the relation between the thermal conductivity and density given by the expression (2).

Examples 7 to 10 and Comparative Examples 43 to 49

According to the same manner as that described in Example 1 except for using the respective polystyrene particles obtained in Reference Examples and Comparative Examples 13 and 14 and changing the pre-foaming ratio, a plate-like foamed material having a density of 0.008 g/cm was obtained, respectively.

The average cell diameter and thermal conductivity of the respective plate-like foamed materials were measured according to the same manner as that described in Examples 1 to 3. The results are shown in Table 10.

TABLE 10 density: 0.008 g/cm³

| | Example 7 | Example 8 | Example 9 |
|---|---|---|---|
| Name of Polymer | (A-1) | (A-3) | (A-4) |
| Average cell diameter (μm) | 180 | 275 | 210 |
| Thermal conductivity (kcal/m · h · °C.) | 0.0335 | 0.0320 | 0.0325 |
| | Example 10 | Comp.Ex.43 | |
| Name of Polymer | (A-5) | (A-6) | |
| Average cell diameter (μm) | 340 | 380 | |
| Thermal conductivity (kcal/m · h · °C.) | 0.0345 | 0.0365 | |
| | Comp.Ex.44 | Comp.Ex.45 | Comp.Ex.46 |
| Name of Polymer | (B-1) | (B-3) | (B-4) |

TABLE 10-continued density: 0.008 g/cm³

| Average cell diameter (μm) | 115 | 150 | 125 |
|---|---|---|---|
| Thermal conductivity (kcal/m · h · °C.) | 0.0380 | 0.0360 | 0.0375 |
| | Comp.Ex.47 | Comp.Ex.48 | Comp.Ex.49 |
| Name of Polymer | (C-1) | (C-3) | (C-4) |
| Average cell diameter (μm) | 95 | 110 | 105 |
| Thermal conductivity (kcal/m · h · °C.) | 0.0395 | 0.0390 | 0.0395 |

When the relation between the average cell diameter and thermal conductivity of the plate-like foamed materials obtained in the respective Examples and Comparative Examples shown in Table 10 is respectively plotted on the graph of FIG. 1, the curve of the density 0.008 g/cm³ is obtained. As is apparent from this graph, the thermal conductivity decreases when the average cell diameter is within the range from about 175 to 350 μm in the density of 0.008 g/cm³.

We claim:

1. A foamed styrene resin material having a density ρ of 0.02 to 0.008 g/cm³, wherein a melt tension of the styrene resin is from 5 to 40 gf, the foamed styrene resin material having a relation between an average cell diameter d (μm) and the density ρ given by the expression:

$$\frac{35}{\rho^{1/3}} \leq d \leq \frac{70}{\rho^{1/3}} \quad (1)$$

and a relation between a thermal conductivity λ (kcal/m·h·°C.) and the density ρ given by the expression:

$$\lambda \leq 0.0001 \times \frac{1}{\rho} + 0.023. \quad (2)$$

2. The foamed styrene resin material according to claim 1, which is produced by foaming foamable styrene polymer particles to obtain pre-foamed styrene resin polymer particles, and filling a mold with the pre-foamed styrene resin polymer particles, followed by foaming with heating.

3. The foamed styrene resin material according to claim 2, wherein the foamable styrene polymer particles are produced by suspension-polymerizing a styrene monomer in an aqueous medium with dispersing seed particles of the styrene polymer particles in the presence of a polymerization initiator, and then impregnating the resulting polymer particles with a foaming agent.

4. The foamed styrene resin material according to claim 3, wherein the foaming agent is an easily volatile aliphatic hydrocarbon.

5. The foamed styrene resin material according to claim 4, wherein the aliphatic hydrocarbon is butane.

6. An insulating material for construction, comprising the foamed styrene resin material of claim 1.

* * * * *

UNITED STATES PATENT AND TRADEMARK OFFICE
CERTIFICATE OF CORRECTION

PATENT NO. : 6,034,143
DATED : March 7, 2000
INVENTOR(S) : Ikuo Morioka, Yukio Aramomi, Mutsuhiko Shimada It is certified that error appears in the above-identified patent and that said Letters Patent is hereby corrected as shown below:

Change filing date from "May 27, 1999" to "May 24, 1999"

Signed and Sealed this

Third Day of July, 2001

*Attest:*

*Attesting Officer*

NICHOLAS P. GODICI
*Acting Director of the United States Patent and Trademark Office*

UNITED STATES PATENT AND TRADEMARK OFFICE
CERTIFICATE OF CORRECTION

PATENT NO. : 6,034,143      Page 1 of 1
DATED : March 7, 2000
INVENTOR(S) : Ikuo Morioka, Yukio Aramomi, Mutsuhiko Shimada It is certified that error appears in the above-identified patent and that said Letters Patent is hereby corrected as shown below:

Change the filing date from "May 27, 1999" to "May 24, 1999"

Signed and Sealed this

Twentieth Day of November, 2001

Attest:

NICHOLAS P. GODICI
*Attesting Officer*     *Acting Director of the United States Patent and Trademark Office*